April 18, 1939.　　N. G. SCHÖNANDER　　2,154,998
X-RAY TUBE
Filed April 6, 1937
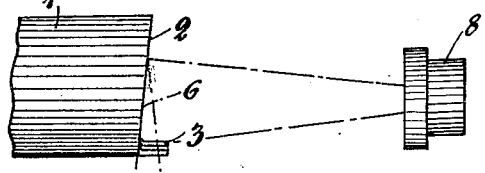
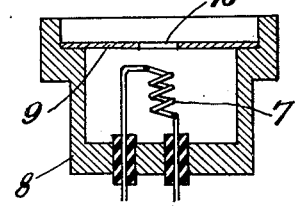
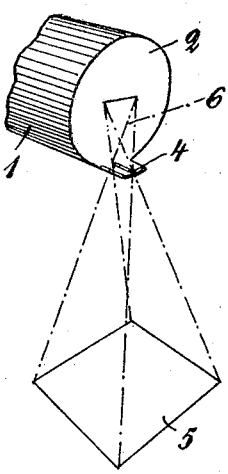
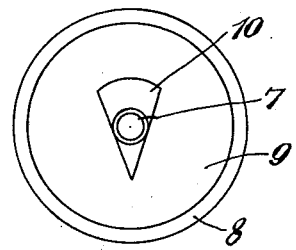
N. G. Schönander
Inventor
By Glascock Downing & Seebold
Attys.

Patented Apr. 18, 1939

2,154,998

UNITED STATES PATENT OFFICE 2,154,998

X-RAY TUBE

Nils Georg Schönander, Stockholm, Sweden

Application April 6, 1937, Serial No. 135,334
In Sweden April 20, 1936

4 Claims. (Cl. 250—145)

The present invention relates to X-ray tubes and more particularly to an arrangement in such tubes for producing sharply defined images or radiographs.

It has been known to arrange the anode surface for this purpose so that it forms a relatively large angle with the plane of image. In this manner it has been possible to give the focus or focal spot a comparatively great length and yet obtain a sharp definition of the image since by reason of the inclined position of the anode surface the focus will appear considerably shortened from the plane of image. It has also been known to improve the definition of the image by screening off the side portions of the focus by means of a diaphragm having a slot-shaped aperture so that only a comparatively small portion of the focus will appear from the field of image. The side portions of the focus thus screened off will cause however a secondary radiation from the erradiated sides of the diaphragm aperture, resulting in a blurring of the image.

The above inconvenience present in the known X-ray tubes is avoided according to this invention by giving the focus or focal spot substantially the same shape and extent as the optical projection of the field of image on the anode surface through the diaphragm aperture. Preferably the arrangement is such that the focal spot gets the shape of a sector of a circle or a triangle, having one of its points positioned in the diaphragm slot extending from the anode surface.

In order that the invention may be clearly understood and readily carried into effect the same will now be described more fully with reference to the accompanying drawing, in which:—

Fig. 1 is a side view of the electrodes showing the diaphragm associated with the anode and focusing shield of the cathode.

Fig. 2 is a perspective view illustrating the course of the rays in such an arrangement.

Fig. 3 is a sectional view of the cathode focusing shield, and

Fig. 4 is an elevational view illustrating the shape of the aperture provided in the shield plate.

The anode 1 consists of a body which is of substantially cylindrical shape at its free end and the end surface 2 of which is inclined in relation to the longitudinal axis of the anode. At the edge of the surfac 2 the anode is provided with a projection 3 extending longitudinally of the anode, said projection being provided with a slot or slit 4 extending from the anode surface 2 in the longitudinal direction of the anode and serving as a diaphragm aperture for the X-rays emitted from the anode surface towards the field of image 5. The projection 3 is, of course, sufficiently thick to be substantially impervious to the X-rays. The anti-cathode is as usual so arranged in respect to the field of image that the latter will receive only such rays as are emitted from the anode surface under small angles of elevation relatively to said surface. Preferably the angle of elevation does not exceed 20° to 30°. The maximum angle of elevation being determined by the length of the diaphragm opening. The field of image 5 is defined as that part of the plane of image which is covered by the radiographic plate or image respectively. When using a rectangular field of image the optical projection of the field of image on the anode surface through the diaphragm aperture will be substantially of triangular shape as will be clear from Fig. 2. According to the invention the focal spot on the anode surface is given substantially the same shape and extent as the projection of the field of image on the anode surface. In the example shown, the focal spot thus has a substantially triangular shape. Such a focal spot can be produced by means known per se, for instance by suitably shaping the surface of the hot-cathode emitting the electrons, by the provision of focusing means 8 at the hot-cathode, and by the aid of an intermediary electrode 9 having a passage opening 10 of the desired shape.

The cathode filament 7 is helically wound and arranged coaxially with respect to the longitudinal axis of the anode. The filament is mounted within a cylindrical metal focusing shield 8 which has one end thereof closed by a shield plate 9. The plate 9 is provided with a sector shaped aperture 10 so that the electron emission is projected onto the anode surface so as to form a sector shaped or substantially triangular focal spot.

For the purpose of obtaining a symmetrical beam of rays the slot 4 is preferably disposed in a plane which is perpendicular to the surface of the anode and the image field. The slot-shaped diaphragm aperture is furthermore preferably arranged in a plane which is substantially parallel with the plane of image or the longitudinal axis of the tube respectively, insuring that the projections of the focal spot on the plane of image in all directions through the diaphragm aperture will form mutually parallel rectangular surface elements. The zones or surface elements of the focal spot visible or appearing from individual points in the field of image will obtain, due to the diaphragm, sharp contours and in addition will have practically the same area for all points in the field of image so that a uniform intensity of radiation is obtained over the entire field of image.

By using, in combination with a slot-shaped diaphragm opening, a focal spot delimited according to the invention sharply defined images will be obtained, and simultaneously the intensity of radiation and the sharpness of definition will be uniform over the whole field of image. When arranging the diaphragm slot so that it reaches onto the anode surface, the point of the focal spot turned towards the diaphragm will be positioned in the diaphragm aperture proper so that for a certain intensity of radiation the area of the focal spot will be a minimum, invloving in turn a corresponding reduction of the energy consumption and the production of heat on the anode.

I claim:

1. An X-ray apparatus comprising, an X-ray tube having a thermionic cathode, an anode, a diaphragm having a slot-shaped aperture, a rectangular image screen, and means for projecting an electron emission from the cathode on to the anode to activate the anode, said means being adapted to form a triangular focal spot on the anode coinciding with the optical projection of the image screen on the anode through the diaphragm aperture.

2. An X-ray apparatus comprising, an X-ray tube having a thermionic cathode, an anode, a diaphragm located close to the anode and having a slot-shaped aperture extending parallelly with a plane through the longitudinal axis of the tube perpendicular to the anode surface, a rectangular image screen and means for projecting an electron emission from the cathode on to the anode to activate the anode, said means being adapted to form a triangular focal spot on the anode coinciding with the optical projection of image screen on the anode surface through the diaphragm aperture.

3. An X-ray tube comprising a thermionic cathode, an anode, a diaphragm located close to the anode and having a slot-shaped aperture extending parallelly with a plane through the longitudinal axis of the tube perpendicular to the anode surface, and means for projecting an electron emission from the cathode on to the anode to activate the anode said means being adapted to form a triangular focal spot on the anode having its apex turned towards the diaphragm aperture.

4. An X-ray tube comprising a thermionic cathode, an anode, a diaphragm forming a flap-shaped extension of the anode and having a slot-shaped aperture extending from the anode surface substantially parallelly with the longitudinal axis of the tube, and means for projecting an electron emission from the cathode on to the anode to activate the anode said means being adapted to form a triangular focal spot on the anode having its apex located close to the diaphragm aperture.

NILS GEORG SCHÖNANDER.